(12) United States Patent
Jaeggle et al.

(10) Patent No.: US 8,167,774 B2
(45) Date of Patent: May 1, 2012

(54) PROCESS FOR CONTROLLING A TWIN CLUTCH

(75) Inventors: Gerd Jaeggle, Lichtenau (DE); Juergen Eich, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 515 days.

(21) Appl. No.: 12/384,409

(22) Filed: Apr. 3, 2009

(65) Prior Publication Data

US 2009/0264254 A1 Oct. 22, 2009

(30) Foreign Application Priority Data

Apr. 7, 2008 (DE) .......................... 10 2008 017 558

(51) Int. Cl.
*B60W 10/00* (2006.01)
*B60W 10/02* (2006.01)
*B60W 10/04* (2006.01)
*F16H 59/00* (2006.01)
*G06F 7/00* (2006.01)
*G06F 17/00* (2006.01)

(52) U.S. Cl. ............ 477/174; 477/180; 477/70; 477/76; 74/337; 701/55; 701/67

(58) Field of Classification Search .................. 477/174, 477/180, 70, 76, 98; 74/335, 337; 701/55, 701/56, 67
See application file for complete search history.

(56) References Cited

U.S. PATENT DOCUMENTS

| | | | |
|---|---|---|---|
| 7,080,569 B2 * | 7/2006 | Preisner et al. | 74/337 |
| 7,329,205 B2 * | 2/2008 | Preisner et al. | 477/80 |
| 7,966,116 B2 * | 6/2011 | Priller et al. | 701/68 |
| 2009/0069992 A1 * | 3/2009 | Preisner et al. | 701/67 |
| 2009/0258757 A1 * | 10/2009 | Man et al. | 477/166 |
| 2010/0331141 A1 * | 12/2010 | Dobele et al. | 477/79 |

* cited by examiner

*Primary Examiner* — Tisha Lewis
(74) *Attorney, Agent, or Firm* — Davidson, Davidson & Kappel, LLC

(57) ABSTRACT

A process for controlling a twin clutch transmission with two partial drive trains with respectively a friction clutch interposed between an internal combustion engine and the partial drive train is provided. If the transmission capacity of a friction clutch falls below the engine torque, engine intervention takes place. If the clutch temperature rises further above a default value, an emergency operation is initiated, in which the affected partial drive train is deactivated by opening the affected friction clutch, a preselection strategy used in the other partial drive train is changed and the other partial drive train is activated.

13 Claims, 1 Drawing Sheet

PROCESS FOR CONTROLLING A TWIN CLUTCH

This claims the benefit of German patent Application No 10 2008 017 558.7 filed Apr. 7, 2008 and hereby incorporated by reference herein.

The present invention relates to a process for controlling a twin clutch transmission with two partial drive trains that can be coupled respectively with an internal combustion engine by means of a friction clutch.

BACKGROUND

Twin clutch transmissions and processes for their control are known. In a twin clutch transmission, both partial drive trains are operated alternately by closing the respective associated friction clutch. During the operation of one partial drive train, the other one is prepared for the next operation. This means, among others, that according to a preselection strategy, the next likely gear in the driving operation is already preselected; for instance, in a twin clutch transmission with gearwheel pairs comprising a fixed gear and a selectable mating gear is already engaged, wherein the shifting clutch connecting the mating gear with the corresponding shifter shaft is already shifted or prepared for shifting. Once the gear to be activated is engaged, shifting takes place by overlapping the two friction clutches, thus by concurrent actuation of the friction clutch, from the closed into the opened state in the active partial drive train, and from open to the closed state of the friction clutch in the partial drive train to be activated anew. In the then deactivated partial drive train, a further gear is subsequently prepared for shifting or engaged immediately according to the preselection strategy.

Due to stress on friction clutches during start-up processes, in particular under heavy load, successive rapid gearshifts, thus overlapping gearshifts being constantly associated with clutch slip can impair the transmission capacity of the friction clutches; so that, under certain circumstances, the transmission capacity drops, thus the maximum clutch torque is no longer transmitted because, for instance, the friction linings of the friction clutches fade due to decreased coefficient of friction. Subsequently, the prevailing torque of the internal combustion engine in that case can no longer be transmitted and undesired slip occurs. To rectify this, the engine torque is reduced. This can jeopardize the propulsion of the vehicle equipped with the twin clutch transmission.

SUMMARY OF THE INVENTION

An object of the present invention is therefore to control a twin clutch transmission such that the risk of the vehicle coming to a standstill can be avoided or delayed at least. Furthermore, the affected friction clutch should be protected from damages.

The present invention provides a process for controlling a twin clutch transmission with two partial drive trains that respectively feature multiple selectable gears, and of which one partial drive train with an actively engaged gear is respectively operated, whilst in the other partial drive train, according to a preselection strategy, a gear for subsequent driving operation is engaged. In this case, a friction clutch is assigned respectively to one partial drive train that is activated by a control device via a travel- or force-controlled actuator and that transmits maximum clutch torque upon attaining or exceeding a prescribed threshold value. In case this maximally transmittable clutch torque is not sufficient to transmit the torque developed by an internal combustion engine driving the twin clutch transmission, reduction of the driving engine torque will be required. During this reduction of engine torque, the affected friction clutch can be closed maximally in order to enable a probably necessary adjustment of the friction clutch via additional travel. In case, by falling short of the maximum clutch torque of a friction clutch, a clutch temperature value associated with this friction clutch is exceeded, through which fading of the friction clutch can be detected, an emergency operation will be initiated. This emergency comprises at least deactivation of the clutch assigned to this partial drive train, by opening the friction clutch, by changing the preselection strategy and by activating the other partial drive train.

At least one of the friction clutches is a self-opening-closed friction clutch. This means that the friction clutch is pressed-closed by an actuator, for instance a lever actuator, against the effect of an opening force, so that, upon deactivation of the actuator, the friction clutch independently opens and hence prevents interlocking the transmission, when, for instance, both friction clutches transmit torque to the partial drive trains whilst gears are engaged in both partial drive trains.

Upon recovery of the friction clutch or rather its friction linings, it can be provided that, depending upon falling short of the clutch temperature, the emergency operation is deactivated again and return is made to normal operation of the twin clutch transmission, in which, again, both partial drive trains and the preselection strategy intended for this purpose are used. Through the selection of clutch temperature, deactivation of the emergency operation can take place directly, since, in general, the properties of the friction lining and its degree of damage are a direct function of the temperature. A temperature sensor in the area of the friction clutches can be provided as clutch temperature for each respective friction clutch. It has proved, however, advantageous to use a clutch temperature model to determine the clutch temperature, wherein, for instance, clutch temperature can be derived from the torque and slip transmitted via the individual friction clutch. In this way, corresponding temperature sensors can be omitted to save costs.

In addition, it has proved advantageous if a damage index is calculated besides the clutch temperature. A damage index indicates the damage to the friction clutch as well as their components dependent upon the frictional power put into the clutch. Depending on such a damage index, for instance, protective measures can be initiated for the friction clutches. In particular, a damage index can be used to monitor the clutch pressure plates made of cast iron. In this regard, empirical and/or temperature variations determined via computation programs dependent upon torque input, slip, temperature and/or temperature gradient can be correlated to the damage behavior so that in good time prior to the damage expected, appropriate measures like the activation of emergency operation can be met. If, thereby, a pressure plate of an individual friction clutch is affected, this friction clutch can be opened at least temporarily, until it has cooled down below a value uncritical to the pressure plate. If the common pressure plate or rather both friction clutches are affected, a warning message can be output, in good time, with subsequent lay up of the vehicle at short notice.

The damage index is formed advantageously as a routine for monitoring thermal shock of a friction clutch pressure plate under frictional engagement. Upon detection of thermal shock, the affected friction clutch can be opened for a predetermined time interval, wherein the length of the time interval can be made to depend upon the empirical or calculated cooling behavior of the pressure plate. It is understandable that, for this purpose, corresponding safety factors can be provided with preset or adjustable extra time. By monitoring possible occurrence of thermal shock, if necessary, a high-quality and hence expensive cast material, which withstands thermal shock without monitoring, can be dispensed with; in that, in individual cases, by monitoring thermal shock at the right time for the driver, with only a little scope of loss of comfort, an emergency operation can react to thermal shock, upon detection.

In addition, a routine can be provided additionally, in which a self-opening function for an application with at least one self-opening friction clutch is checked within a preset time interval, and in case the self-opening function is absent, the emergency operation will be initiated. If the self-opening function of a friction clutch is faulty, it will no longer open or it will no longer open correctly so that during overlapping gearshift, particularly the twin clutch transmission can be interlocked when gears are engaged in both partial drive trains. If the routine for monitoring the self-opening function results in a default number of unsuccessful self-openings, for instance a number between one and five, then the emergency operation will be activated. The self-opening function can be temporarily faulty or it may fail, for instance at very high or very low temperatures, so that the vehicle must not be advantageously laid up immediately. On the contrary, a regular verification routine can be carried out in a further procedure. If self-opening of the friction clutch or clutches occurs again without error after a default number of verifications, the emergency operation can be switched off again and the normal operation initiated. What is certainly advantageous in all cases is the documentation in an error memory of these incidents so that, in case of multiple occurrences of temporary faults, a warning message is output so that if need be, a workshop can be visited. In addition, a warning to the driver is output after a default number of failed self-openings.

BRIEF DESCRIPTION OF THE DRAWINGS

The invention is explained in detail based on FIGS. 1 and 2, as follows.

DETAILED DESCRIPTION

Figure 1:
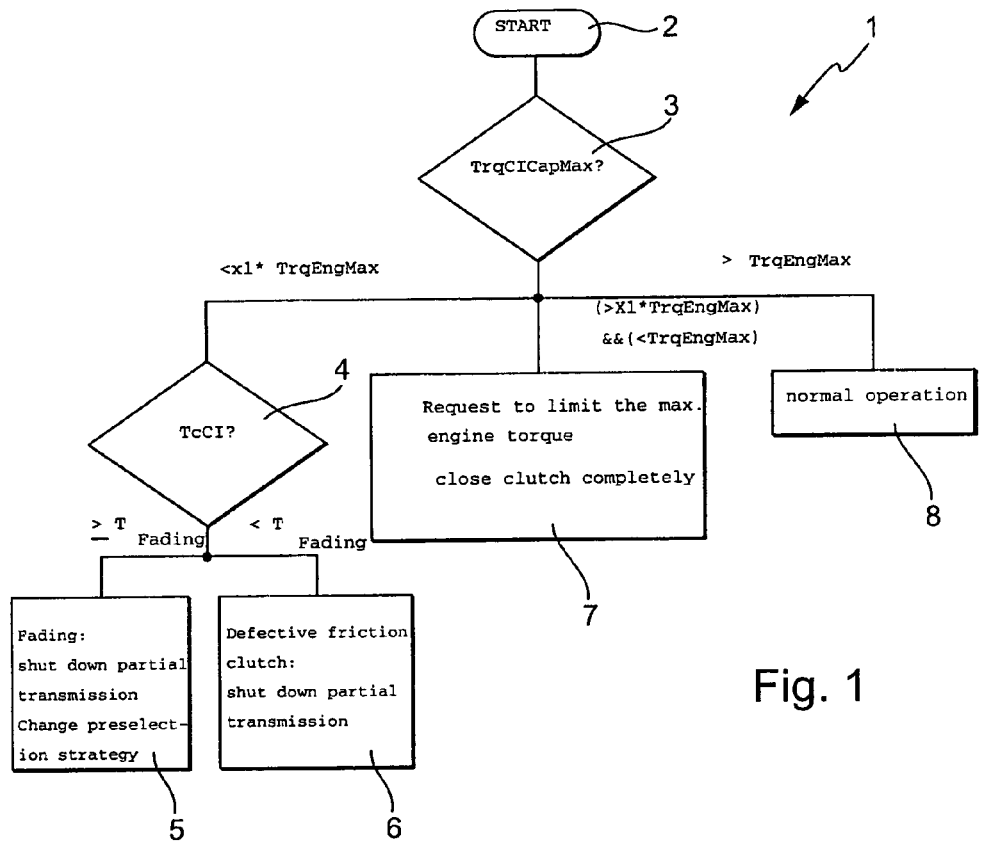
FIG. 1 shows an exemplary embodiment of a routine for monitoring the torque transmission behavior of a friction clutch and FIG. 2 shows an exemplary embodiment of a routine for application of a damage index to a friction clutch.

FIG. 1 shows an exemplary embodiment of a routine 1 for monitoring and controlling a twin clutch transmission, depending upon the state of the friction clutches. In doing so, the routine 1 for both friction clutches of the twin clutch transmission can be performed in series, thus successively or in parallel by means of indexing the individual quantities for assignment of individual values to the corresponding friction clutch. The routine 1 is started in block 2. In the subsequent branch 3, the maximum clutch torque transmittable via the friction clutch TrqClCapMax is determined. For this purpose, quantities like the prevailing engine torque TrqEngMax and the friction clutch slip or a model of the friction clutch, if necessary, as adapted in the driving operation can be used. If the maximum clutch torque TrqClCapMax is greater than the prevailing engine torque TrqEngMax, then normal operation is continued in block 8. Under normal operation, one understands an overlap of the two friction clutches when driving with a closed friction clutch of the active partial drive train and preselection of a gear whilst the friction clutch is open, according to a default preselection strategy in the other partial drive train, and a gearshift desire, if a control device is present.

In branch 3, it is verified whether, if applicable, a smaller maximum clutch torque TrqClCapMax falls short of a default fraction of engine torque TrqEngMax by a factor x1. If this is the case, then it is decided in branch 4, whether a fading temperature $T_{Fading}$ is attained or exceeded, based on a clutch temperature model that determines and integrates the thermal capacities of clutch component parts, the torque input into the friction clutch and the slip that occurs in the process. If this is the case, then an emergency operation is initiated in block 5, which shuts down the affected partial transmission, in that the friction clutch is opened and/or the engaged gear is disengaged under corresponding conditions. The vehicle can then continue driving with the other partial drive train, by changing the preselection strategy. If clutch temperature TcCL is lower than the fading temperature $T_{Fading}$ then a defective friction clutch may be evident. In this case, the partial transmission is shut down in block 6 and an engaged gear preferably disengaged. A warning message to look for a workshop is output advantageously.

If the maximum clutch torque TrqClCapMax lies between the prior described states, a torque request to limit the maximum engine torque to be developed TrqEngMax will be output, for instance, via CAN-bus or via a separate line to the control device of the internal combustion engine, in order to minimize the load on the friction clutch.

The routine 1 is preferably passed through cyclically, if necessary, in order to adapt the control system to the changing quantities.

Figure 2:
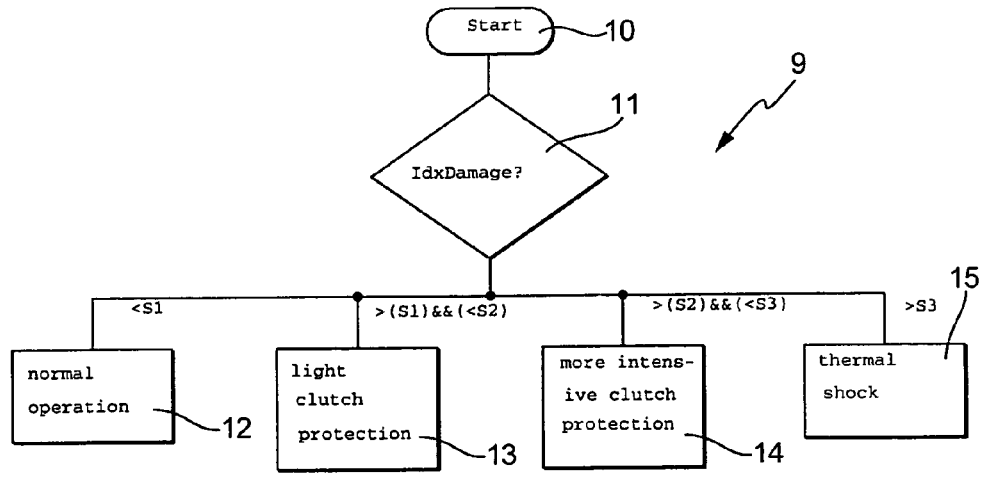

FIG. 2 describes a process for evaluating damage on one or both friction clutches based on the damage index IdxDamage, by means of routine 9. This is started in block 10. In the following branch 1, the damage is divided, based on the damage index IdxDamage with three index quantities S1, S2, and S3, in four damage classes, against which, in the blocks 12, 13, 14, and 15, corresponding measures are taken. If the damage is equal to zero or is negligible, then normal operation will be sustained in block 12. In the second damage class, a light clutch protection occurs in block 13. This includes a changed preselection strategy, in which the other drive train is preferred, in that, for instance, the gears engaged there are run at higher revs or gearshifts occur with traction force interruptions on the same partial drive train. Engine intervention can occur selectively in this class. In the next class, clutch protection can be made further intensive in block 14, in that, for instance, the measures of block 13 are made more intensive or one partial drive train is temporarily deactivated. In the last damage class in block 15, a thermal shock can be assumed, in which a high temperature gradient endangers cast iron parts, for instance the pressure plate of the affected friction clutch. This can for instance burst under overload. To circumvent this danger, the drive train is temporarily deactivated for so long until the damage index IdxDamage has again fallen below the index quantity S3. The index quantities S1, S2, and S3 can be determined, for instance, based on material and design data of the clutches.

LIST OF REFERENCE SYMBOLS 1 routine
2 block
3 branch
4 branch
5 block
6 block 7 block
8 block
9 routine
10 block
11 branch
12 block
13 block
14 block
15 block
IdxDamage damage index
S1 index quantity
S2 index quantity
S3 index quantity
TcCl clutch temperature
TFading fading temperature
TrqClCapMax maximum clutch torque
TrqEngMax engine torque
x1 proportional factor

What we claim is:

1. A method for controlling a twin clutch transmission with two partial drive trains, which respectively feature multiple executable gearshifts, and in which one partial drive train is operated respectively with one gear actively engaged and in which, in another partial drive train according to a preselection strategy, a gear is engaged for a subsequent driving operation, in which a friction clutch is assigned respectively to one partial drive train, which is actuated by an actuator activated travel- or force-dependently by a control device and, upon attaining or exceeding a default threshold, transmits maximum clutch torque, the method comprising:

if the maximum clutch torque of a friction clutch falls short of a predefined threshold value and once a clutch temperature assigned to this friction clutch is exceeded, an emergency operation is initiated, in which the partial drive train corresponding to the affected clutch is deactivated by opening the friction clutch, changing the preselection strategy, and activating the other partial drive train, wherein, depending upon falling short of a clutch temperature, the emergency operation is deactivated and normal operation restored, wherein a damage index is calculated besides a clutch temperature.

2. The method according to claim 1, wherein the damage index is fed to a routine for monitoring thermal shock of a friction clutch pressure plate under frictional engagement.

3. The method according to claim 2, wherein, once thermal shock is detected, the affected friction clutch is opened for a preset duration of time.

4. The method according to claim 1, wherein in the case of an application with at least one self-opening friction clutch, a self-opening function is monitored within a preset time interval and upon detecting the absence of said self-opening function, the emergency operation is initiated.

5. The method according to claim 4, wherein after a default number of successful self-openings, the emergency operation is deactivated and normal operation is initiated.

6. The method according to claim 5, wherein after a default number of failed self-openings a warning is output to the driver.

7. A method for controlling a twin clutch transmission with two partial drive trains, which respectively feature multiple executable gearshifts, and in which one partial drive train is operated respectively with one gear actively engaged and in which, in another partial drive train according to a preselection strategy, a gear is engaged for a subsequent driving operation, in which a friction clutch is assigned respectively to one partial drive train, which is actuated by an actuator activated travel- or force-dependently by a control device and, upon attaining or exceeding a default threshold, transmits maximum clutch torque, the method comprising: if the maximum clutch torque of a friction clutch falls short of a predefined threshold value and once a clutch temperature assigned to this friction clutch is exceeded, an emergency operation is initiated, in which the partial drive train corresponding to the affected clutch is deactivated by opening the friction clutch, changing the preselection strategy, and activating the other partial drive train, wherein in the case of an application with at least one self-opening friction clutch, a self-opening function is monitored within a preset time interval and upon detecting the absence of said self-opening function, the emergency operation is initiated.

8. The method according to claim 7, wherein, depending upon falling short of the clutch temperature, the emergency operation is deactivated and normal operation restored.

9. The method according to claim 8, wherein a damage index is calculated besides the clutch temperature.

10. The method according to claim 9, wherein the damage index is fed to a routine for monitoring thermal shock of a friction clutch pressure plate under frictional engagement.

11. The method according to claim 10, wherein, once thermal shock is detected, the affected friction clutch is opened for a preset duration of time.

12. The method according to claim 7, wherein after a default number of successful self-openings, the emergency operation is deactivated and normal operation is initiated.

13. The method according to claim 11, wherein after a default number of failed self-openings a warning is output to the driver.

* * * * *